Dec. 2, 1930.    R. A. KUNTZLEMAN    1,783,657
DEVICE FOR TEACHING PENMANSHIP
Filed April 19, 1930
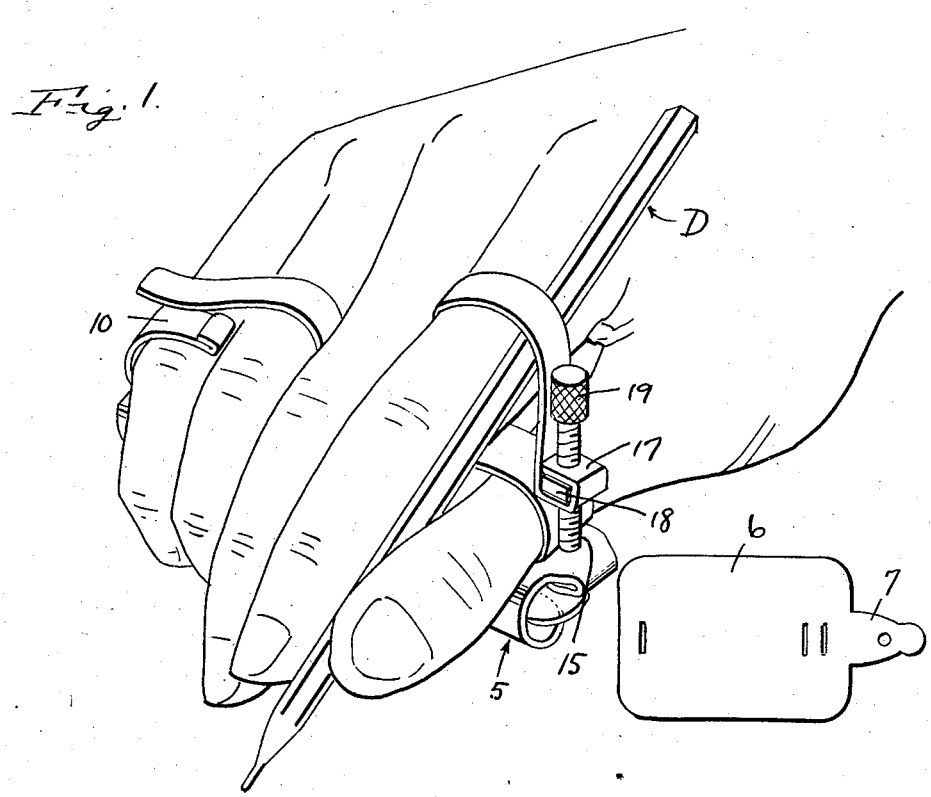
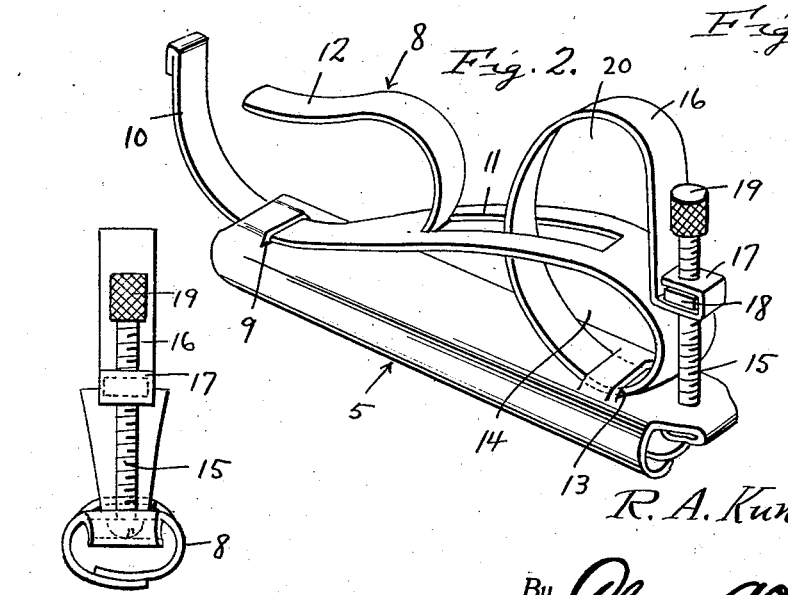
Inventor
R. A. Kuntzleman
By Clarence A. O'Brien
Attorney Patented Dec. 2, 1930

1,783,657

UNITED STATES PATENT OFFICE

ROY ALBERT KUNTZLEMAN, OF BARBERTON, OHIO

DEVICE FOR TEACHING PENMANSHIP

Application filed April 19, 1930. Serial No. 445,715.

This invention relates to certain new and useful and novel improvements in devices for teaching penmanship, and the primary object of this invention is to provide a device of the character above mentioned especially adapted for teaching arm movement writing.

One of the most important objects of this invention is to provide a device for retaining the fingers in the proper position of the hand used in writing and in teaching that method of penmanship known as the "Palmer" method which method of penmanship embodies what is known as arm movement writing permitting of a certain relaxation of the fingers but requiring set position for the fingers as is well known.

It is therefore a very important object of the invention to provide a device whereby the fingers will be yieldably maintained in proper position and which device will be found very helpful to beginners in this style of writing.

A still further object of the invention is to provide a device of this character which is simple in construction, thoroughly reliable, practical, efficient, adjustable and otherwise well adapted for the purpose designed.

Other objects and advantages of the invention will become apparent during a study of the following description taken in connection with the accompanying drawings wherein:

Figure 1 is a perspective view illustrating the manner of using the invention,

Figure 2 is a perspective view of the device per se,

Figure 3 is a plan view of the blank from which the finger rest part of the device is formed.

Figure 4 is an end view of the device.

With reference more in detail to the drawings it will be seen that the invention comprises an elongated substantially tubular body or finger rest 5 the top wall of which is relatively flat. The rest 5 is of suitable length and shown to advantage in Figure 1. When the device is used the rest extends transversely of the fingers adjacent the second joint of the fingers.

The rest 5 may be formed of metal or any other suitable material struck from a single blank 6 of substantially elongated rectangular configuration and provided at one end with the tongue 7. In the formation of the rest 5, the blank 6 is bent inwardly upon itself on two longitudinal spaced lines so that the end portions 8 of the rest bent inwardly toward one another have their longitudinal edges arranged in overlapping relation and shown to advantage in Figure 4.

For retaining the fingers of the writing hand in position upon the rest 5, there is provided a strap member designated generally by the reference character 8 which strap member may be formed of metal, leather or any other suitable material. The strap 8 has one end thereof inserted through a transverse slit 9 in that end of the body or finger support 5 adjacent the little finger, and said end of the strap 8 is then bent upwardly and inwardly as at 10 forming somewhat of a hook for engaging the fourth or little finger of the hand as shown to advantage in Figure 1.

Intermediate its ends the strap 8 is punched out to provide an elongated opening or slot 11 to provide a tongue 12 bent backwardly upon itself and cooperating with the end 10 of the strap to provide what may be termed a split loop through which is passed the third and fourth fingers, the hook 10 as before mentioned engaging the little finger and the bent tongue 12 engaging the third finger.

At its opposite end the strap 8 is bent downwardly and backwardly upon itself and is passed through a pair of spaced transverse slits 13—13 formed in the rest 5 inwardly from what may be termed the thumb end of the rest. The last referred to end of the strap 8 is then passed upwardly through the slot 11 thus forming a lower thumb loop 14 as is evident from a study of Figure 1.

The tongue 7 is bent inwardly upon itself for reception of the headed end of a threaded adjusting bolt 15. To provide a loop for the first or index finger of the writing hand, said last referred to end of the strap is then bent forwardly as at 16, and said strap at said one end terminates in a substantially U-shaped angularly disposed terminal strap 17.

The legs of the U-shaped terminals 17 are provided with registered apertures for reception of the adjusting screw 15. Threaded on the screw and arranged between the legs of said extension 17 is a nut 18. Obviously upon rotation of the nut 15 the nut 18 will be moved axially thereof for drawing the loop end 16 of the strap over the said index finger of the writing hand.

A suitable knurled cap 19 is suitably applied at the upper end of the screw 15 for facilitating the rotation of said screw. The second finger of the writer as will be seen from a study of Figure 1 rests on the strap 8 between the tongue 12 and the loop end 13 of the strap and it will be further noted that through the medium of the loop 14, the portions of the strap between the ends of the finger rest 15 incline from that end of the rest which may be termed the fourth or little finger end of the rest toward the opposite or thumb end of the rest with the result that the index finger will be positioned in proper relation to the thumb whereby the pencil or other writing implement P may be passed through the index finger loop 20 to be engaged between the index finger and thumb for assuming that position in Figure 1 which is the correct angle at which the writing implement should be held in this type of writing known as arm movement writing.

From the foregoing, and from a study of Figure 1, it will then be seen that a device of this character is ideally adapted for teaching arm movement writing and that the rest 5 will prevent the fingers from closing up too tight.

It will also be seen that the same is made long enough to keep the hand from turning or resting on the side so that necessarily the hand must glide on the tip of the other three fingers. It will be also apparent that the pen, pencil or such writing implement will be supported on that part of the band 8 dividing loops 14 and 20 thus preventing the writing implement from sagging below the knuckle joint and further that the writing implement being passed through the loop 20 will also prevent the writing implement from being held too vertical.

It is thought that from the foregoing description taken in connection with the accompanying drawings a clear understanding of the use and advantages of a device of this character will be had by those skilled in the art without a more detailed description.

Even though I have herein shown and described the preferred embodiment of my invention, it is to be understood that the same is susceptible of changes fully comprehended by the spirit of the invention as herein described, and the scope of the appended claims.

Having thus described my invention, what I claim as new is:

1. In a device for teaching penmanship, a metallic strap curved upwardly and inwardly at one end, said strap intermediate its ends provided with an elongated slot, said strap at its opposite end being curved downwardly and inwardly to provide a thumb loop, and said opposite end of the strap passed upwardly through said slot and then bent forwardly upon itself to provide a loop for receiving the index finger of the writing hand, the portion of the strap inclining downwardly from the slot to said first mentioned end adapted to support thereon the remaining three fingers of the writing hand.

2. In a device for teaching penmanship, an elongated body member, a flexible strap, means for mounting said strap on said body member, said strap at one end of said body member curving upwardly and inwardly to engage the little finger of the writing hand and the portion of said strap between the end of said body member gradually inclining upwardly from the first referred-to end of said body member to the other end of said body member, and said strap intermediate the ends of said member provided with a flexible tongue having its end portion bent in a direction toward the first mentioned end of the strap for engaging the second finger of the writing hand, and said strap having a slot formed in the inclined portion thereof, and the other end of said strap bent downwardly and inwardly to provide a lower thumb receiving link, said last referred to end of the strap passing upwardly through said slot and then bent in an opposite direction from said tongue to provide an index receiving loop.

3. In a device for teaching penmanship, an elongated body member, a flexible strap, means for mounting said strap on said body member, said strap at one end of said body member curving upwardly and inwardly to engage the little finger of the writing hand and the portion of said strap between the end of said body member gradually inclining upwardly from the first referred-to end of said body member to the other end of said body member, and said strap intermediate the ends of said member provided with a flexible tongue having its end portion bent in a direction toward the first mentioned end of the strap for engaging the second finger of the writing hand, and said strap having a slot formed in the inclined portion thereof, and the other end of said strap bent downwardly and inwardly to provide a lower thumb-receiving link, said last referred-to end of the strap passing upwardly through said slot and then bent in an opposite direction from said tongue to provide an index receiving loop, and means for adjustably securing said last referred-to end of the strap at the terminal to the corresponding end of said body member.

In testimony whereof I affix my signature.

ROY ALBERT KUNTZLEMAN.